(12) United States Patent
Lichtberger

(10) Patent No.: US 11,920,308 B2
(45) Date of Patent: Mar. 5, 2024

(54) METHOD FOR TRACK POSITION IMPROVEMENT BY MEANS OF A TRACK-MOVABLE TRACK-TAMPING MACHINE

(71) Applicant: HP3 Real GmbH, Vienna (AT)

(72) Inventor: Bernhard Lichtberger, Pregarten (AT)

(73) Assignee: HP3 Real GmbH, Vienna (AT)

( * ) Notice: Subject to any disclaimer, the term of this patent is extended or adjusted under 35 U.S.C. 154(b) by 867 days.

(21) Appl. No.: 16/960,471

(22) PCT Filed: Jan. 17, 2019

(86) PCT No.: PCT/AT2019/050005
§ 371 (c)(1),
(2) Date: Jul. 7, 2020

(87) PCT Pub. No.: WO2019/140467
PCT Pub. Date: Jul. 25, 2019

(65) Prior Publication Data
US 2020/0347557 A1 Nov. 5, 2020

(30) Foreign Application Priority Data
Jan. 22, 2018 (AT) .............................. A 50051/2018

(51) Int. Cl.
*E01B 35/10* (2006.01)
*B61K 9/08* (2006.01)
(Continued)

(52) U.S. Cl.
CPC ............... *E01B 35/10* (2013.01); *B61K 9/08* (2013.01); *E01B 27/17* (2013.01); *G01B 5/14* (2013.01)

(58) Field of Classification Search
CPC ........... E01B 35/10; E01B 27/17; B61K 9/08; G01B 5/14
See application file for complete search history.

(56) References Cited

U.S. PATENT DOCUMENTS 5,887,527 A * 3/1999 Theurer .................. E01B 27/20
104/2
6,154,973 A 12/2000 Theurer et al.
(Continued)

FOREIGN PATENT DOCUMENTS

DE 10337976 B4 12/2007
EP 0952254 A1 10/1999
(Continued)

OTHER PUBLICATIONS

Espacenet English Language Abstract of DE 10337976, Dec. 27, 2007.

*Primary Examiner* — Scott A Browne
(74) *Attorney, Agent, or Firm* — Tiajoloff & Kelly LLP

(57) ABSTRACT

A method is proposed for track position improvement by means of a track-movable track-tamping machine (6) with a three-point work measurement system having three measurement carriages (A, B, C) and a cord (9) stretched therebetween, a tamping unit (5), a lifting and straightening unit (8) for tracks and in particular an odometer. The position of the track after the correction work of the track-tamping machine (6) is recorded by means of a measurement system. In order to reduce the straightening error, it is proposed that a computer (R) calculates the difference between a predetermined desired track position (1) and an actual position recorded by the measurement system, i.e. a residual error ($K_h$), and in that the position of the rear cord end on the rear measurement carriage (C) of the track-tamping machine (6) of the three-point work measurement system is continuously corrected in such a way that the rear cord end on the measurement carriage (C) is guided on the desired track position (1).

21 Claims, 6 Drawing Sheets

Figure 1:
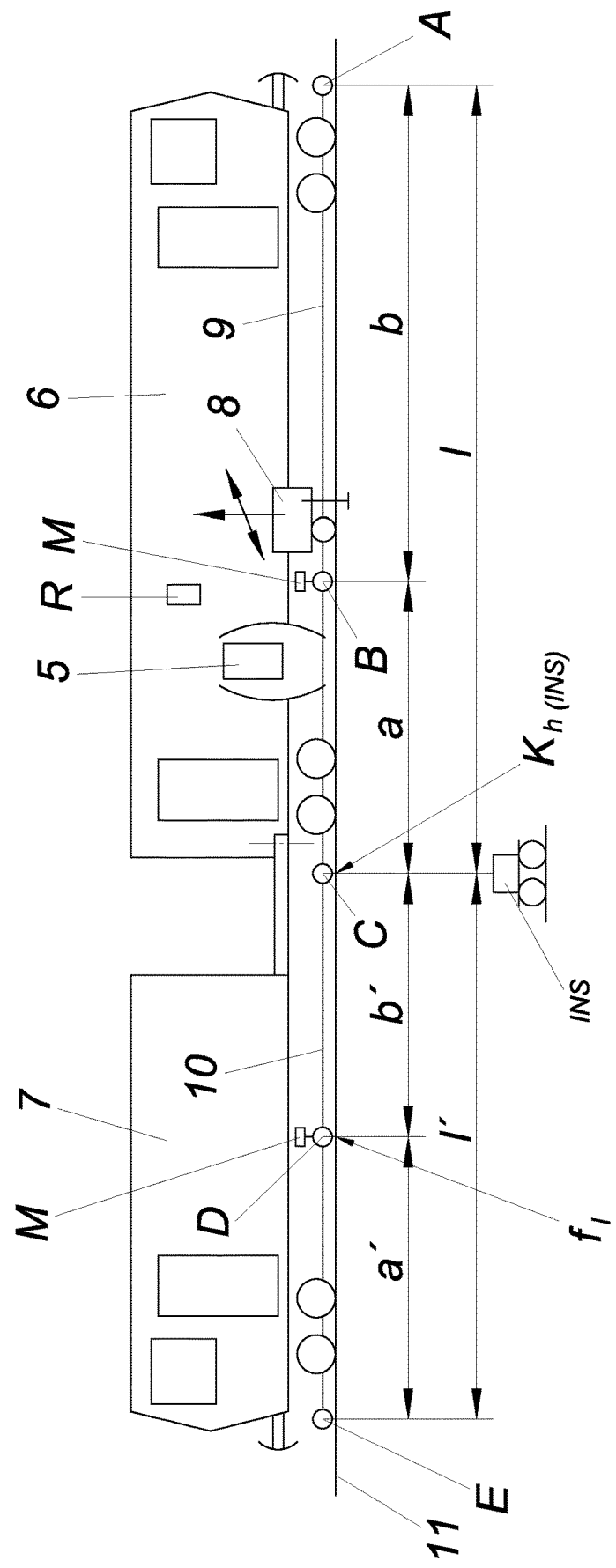

(51) Int. Cl.
*E01B 27/17* (2006.01)
*G01B 5/14* (2006.01)

(56) References Cited

U.S. PATENT DOCUMENTS

| | | |
|---|---|---|
| 8,186,070 B2 | 5/2012 | Theurer et al. |
| 9,631,325 B2 | 4/2017 | Lichtberger |
| 2010/0018432 A1 | 1/2010 | Theurer et al. |
| 2015/0368865 A1 | 12/2015 | Lichtberger |

FOREIGN PATENT DOCUMENTS

| | | |
|---|---|---|
| EP | 2957674 A1 | 12/2015 |
| WO | 2008/125168 A1 | 10/2008 |

\* cited by examiner

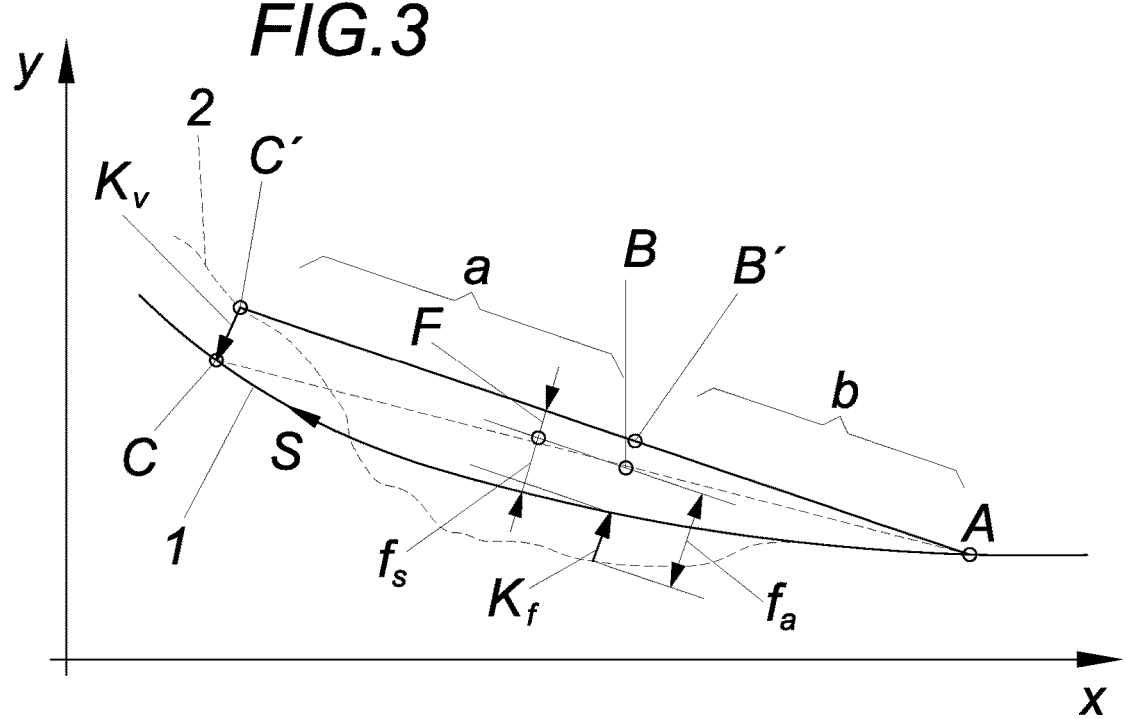
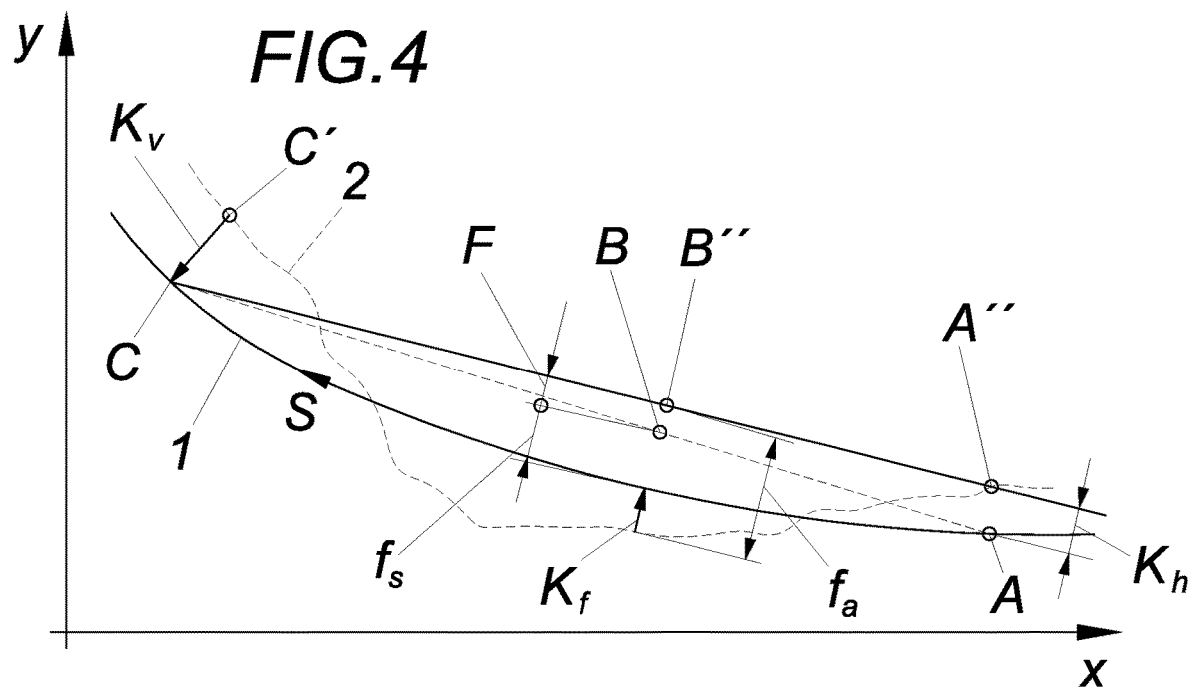

METHOD FOR TRACK POSITION IMPROVEMENT BY MEANS OF A TRACK-MOVABLE TRACK-TAMPING MACHINE

FIELD OF THE INVENTION

The invention relates to a method for improving the three-point method which is used for track position improvement by track-tamping machines.

DESCRIPTION OF THE PRIOR ART

Most of the tracks for the railway are designed as ballasted tracks. The sleepers lie in the ballast. The wheel forces of the trains passing over them cause irregular settlements in the ballast and shifts in the lateral position geometry of the track. The settlements of the ballast bed cause errors in the longitudinal height, superelevation (in curves) and directional position. If certain comfort limits or safety limits of these geometric variables are exceeded, maintenance work is carried out. A track-tamping machine improves the track geometry, which has been deteriorated by the load caused by the trains. For this purpose, the track is lifted and straightened by means of electro-hydraulically controlled lifting and straightening devices into the desired track position and fixed in this position by compacting (tamping) the ballast under the sleepers.

Measurement and control systems based on the three-point method are mainly used to guide the correction tools of the permanent way machine. Practical experience shows that although the track positions are improved, the theoretically possible improvements are far from being achieved. Track position errors are typically only reduced between 30-50%. The shape and position of the track position errors are usually retained, only the amplitudes of the errors are reduced.

To ensure that the track can be released for train operation again after such track geometry improvement work, the permanent way machines are equipped with so-called acceptance measurement systems and an acceptance recorder. This acceptance recorder is used to record the remaining defects. For release, the tolerances of the track position errors must be kept below the specified limits.

The smaller the residual errors after maintenance work are, the lower are the interacting forces between wheel and rail caused by the trains, the slower the track geometry deteriorates again and the longer the durability of the track position. It is therefore desirable to bring the track geometry as close as possible to the desired position, because this can then save considerable costs and effort.

Various track alignment methods have been developed for the correction of track faults. On the one hand there are relative methods which only smooth the track position and on the other hand there are absolute methods. The latter have become widely accepted by modern railways. With the absolute methods, the track positions are corrected according to specified nominal geometries. The nominal geometries of the railway tracks are available as track position plans and can be used, after input in a computer of the permanent way machine, to calculate the systematic errors with knowledge of the behavior of the measurement systems. If the absolute correction values for the front end of the machine measuring device are known, then the front end of the machine measuring device is guided on the track nominal geometry and the rear end on the already corrected track. The straightening and lifting operation is carried out at the work position. The position of the tamping machine in the longitudinal axis of the track is determined with an odometer. This procedure is known as the three-point method.

The disadvantage of the current application of the three-point method is that, contrary to the theoretically expected improvement in track position, the unsatisfactory reduction of track position errors by only about 30-50% is achieved. With this deficient function of the three-point method, the potential for effort and cost savings which would result from a better application is not fully exploited. The reason for this deficient function is that the rear end of the cord is not guided exactly on the track's nominal geometry, but has residual errors which are fed back into the system. These errors are caused by irregular settlements of the track after lifting and by spring-back of the track after straightening, and by the feedback of these errors into the control loop. The resulting settlements depend on the height and condition of the ballast. The springback of the track depends on the straightening forces, the properties of the rail fastenings and the behavior of the track itself. The endlessly welded track exhibits compressive stress at high rail temperatures (from about T>20° C.) and tensile stress at low temperatures (from about T<20° C.). After straightening, these internal stresses can cause the track to rebound or bounce back.

When starting and finishing work with a permanent way machine, it must not be possible to make or leave abrupt lifts or corrections to the lateral position, but the values must be successively built up or reduced (ramping up and down). However, this only partially eliminates the real track fault in these transition sections. During and after the construction of the ramp it can be assumed that the rear cord end is on a defective track. Ramping on and off by the machine operator is intuitive and experience-based and the result is not really predictable and objectively assessable.

By means of the acceptance test record, the operator of the machine can see the magnitude of the faults that remain. By means of adjustable correction values, he tries to counteract the oscillating errors. However, since there is a distance of about 10-15 m between the working position and the acceptance measurement position, the track already processed in between can no longer be influenced. The corrections made by the operator represent a prediction of how the error will develop. In this respect, the operator relies on his intuition and experience.

SUMMARY OF THE INVENTION

The invention is thus based on the object of specifying a method which improves the effect of the three-point method in such a way that a reduction of the track position errors of more than only 30-50% is possible. Intuitive and experience-based adjustment of correction values by the operator and the associated error-proneness should be avoided. Ramping up and down at the start and end of work should be able to be carried out automatically in such a way that the rear end of the cord is guided to the desired position in order to prevent feedbacks into the control loop.

The invention solves the set object in that a computer calculates the difference between a predetermined desired track position and an actual position recorded with the measurement system, i.e. a residual error, and in that the position of the rear cord end on the measurement carriage of the three-point work measurement system is continuously corrected in such a way that the rear cord end on the rear measurement carriage of the track-tamping machine is guided on the desired track position.

The rear cord end on the rear measurement carriage of the track-tamping machine is guided mathematically and electronically, i.e. virtually, on the desired track position and not, as was previously the case, on the remaining residual errors on the rear measurement carriage. The fact that with the previous application of the three-point method, the front cord point can be guided electronically on the desired track position, but not the rear cord point on the remaining track faults, results in a feedback system.

The rear cord point runs on the track faults and thus adversely affects the correction result. Therefore, the position of the track after the correction work of the tamping machine is measured as indicated in the next paragraph and this actual position recorded with the measurement system is used to calculate the residual error. The position of the rear cord end on the measurement carriage of the three-point work measurement system is then continuously corrected in such a way that the rear cord end on the rear measurement carriage of the track-tamping machine is guided on the desired track position.

The (rear) measurement carriage of the track-tamping machine is preferably assigned an inertial measurement system which records the position of the track after the tamping machine has carried out its correction work. However, the determination of the residual errors of the track after tamping work could also be carried out alternatively or additionally by extrapolation from the measurements of a subsequent acceptance three-point measurement system with three measurement carriages and a cord stretched between them.

The invention solves the fully automatic ramping up and down by automatically guiding the position of the rear end of the cord on the rear measurement carriage of the tamping machine for forming an initial ramp from a zero correction at the start of work towards the desired track position in such a way that the necessary track corrections are continuously built up and that the position of the cord end on the front measurement carriage of the tamping machine for forming an end ramp is automatically guided from the desired track position towards a zero correction at the end of work in such a way that the necessary track corrections are continuously removed.

The rear end of the cord is guided over a calculated ramp to the desired position of the track. An inertial measurement system is preferably mounted on the measurement carriage of the rear cord end to measure the residual error. The position of the rear end of the cord is corrected with the aid of these measurement errors, which are determined in accordance with the invention, and guided to the desired track position. This prevents feedback and the resulting track position errors of the system.

The inertial measurement system is mounted on a measurement carriage with two sets of wheels which can rotate relative to each other. An odometer is connected to the measurement carriage which measures the distance the measurement carriage covers on the track. The measurement carriage is pressed laterally against the reference rail during the measurement. The inertial measurement system measures the tangent of the track direction and the longitudinal inclination as well as the transverse inclination of the measurement carriage on the track (the superelevation). In equidistant steps for example (typically 0.25, 0.5 or 1 m-quasi-continuous recording is also possible due to the high measuring rates of the inertial measurement system), the measuring data of the inertial measurement system are stored at a corresponding location. For each measuring point, in addition to the data of the inertial measurement system, the exact length of the curve (or "track kilometer") covered is also stored.

During the work, the track of the measurement carriage in space is calculated from the absolute angle differences to the north-based coordinate system of the recorded values of the inertial measurement system for each measuring point (roll, yaw and pitch angle). The differences of this measured actual track position track with the desired track position track results in the absolute track position errors.

Instead of the inertial measurement system, the residual errors can also be calculated from the measured values of a trailing three-point pick-up cord. By means of digital filters an approximate inverse transfer function of the cord measurement can be formed (see e.g. DE 103 37 976 B4) and applied to the measured values and thus calculated back to the actual error curve. The course of this error curve is then extrapolated to the track fault, thus determining the residual error at the rear end of the working measuring cord on the rear measurement carriage. The extrapolation can, for example, be calculated using a sine function or a higher-order polynomial using the method of least squares.

The advantages of the invention lie in the improved track position and the resulting longer durability of the track. This means that the cycle between necessary maintenance work can be considerably extended, which saves considerable costs. Another advantage is that the operator is considerably relieved by the automatic ramping up and down and the elimination of the need to enter corrections during work. A further advantage is the automatically achieved higher track position quality and the elimination of the human error factor.

BRIEF DESCRIPTION OF THE INVENTION

Figure 2:
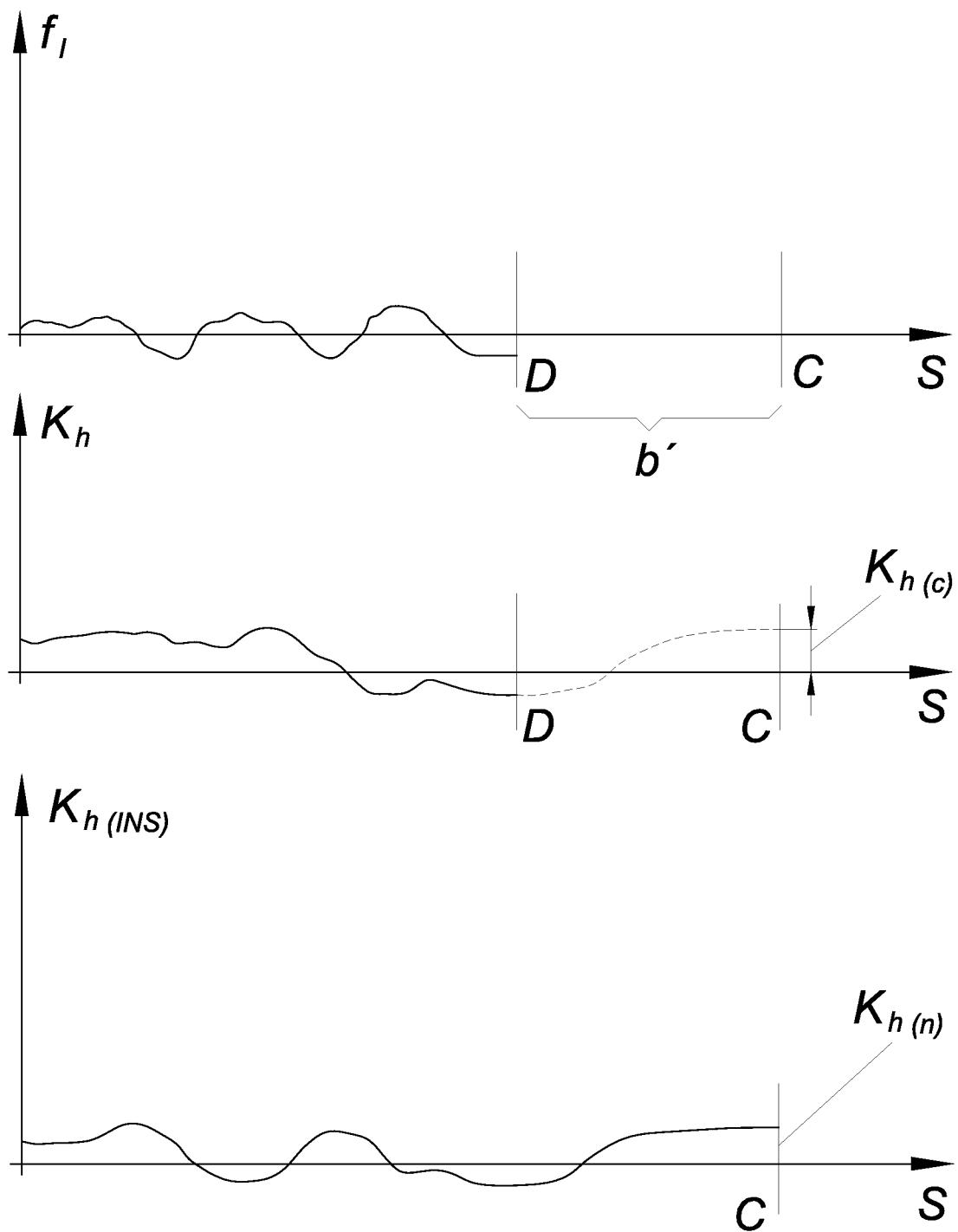
Figure 5:
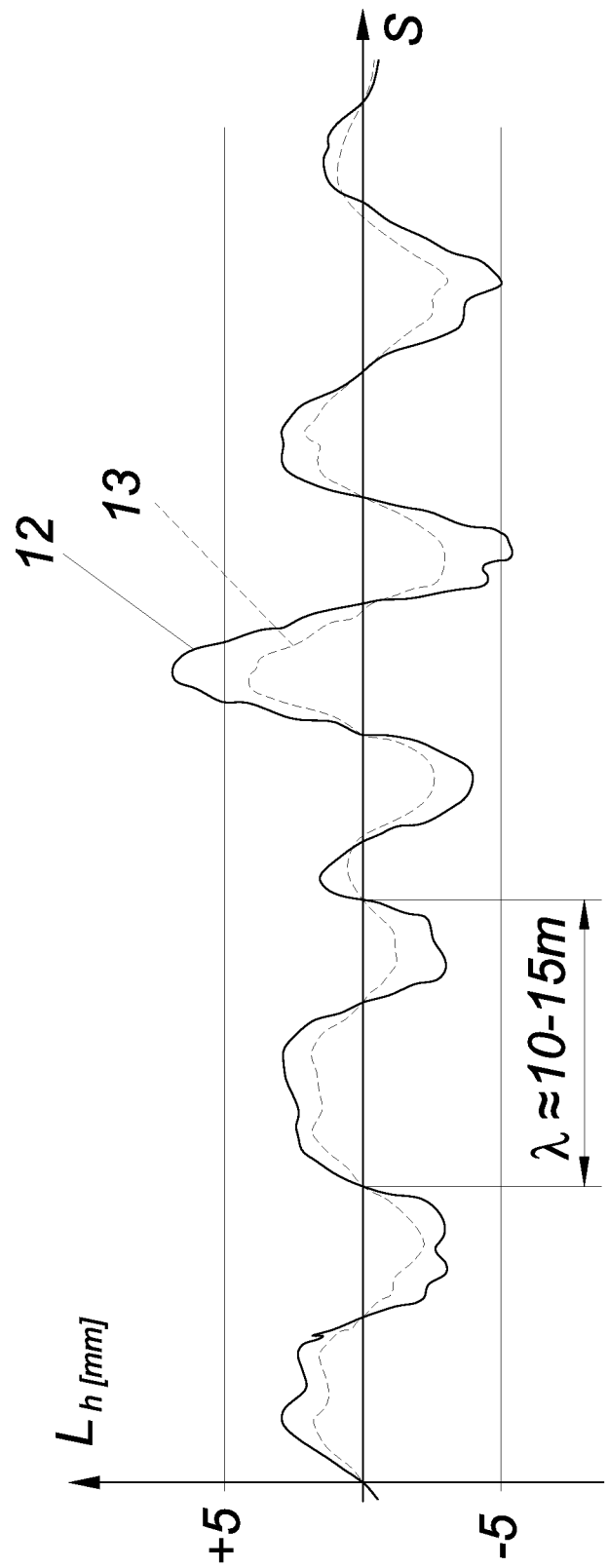
Figure 6:
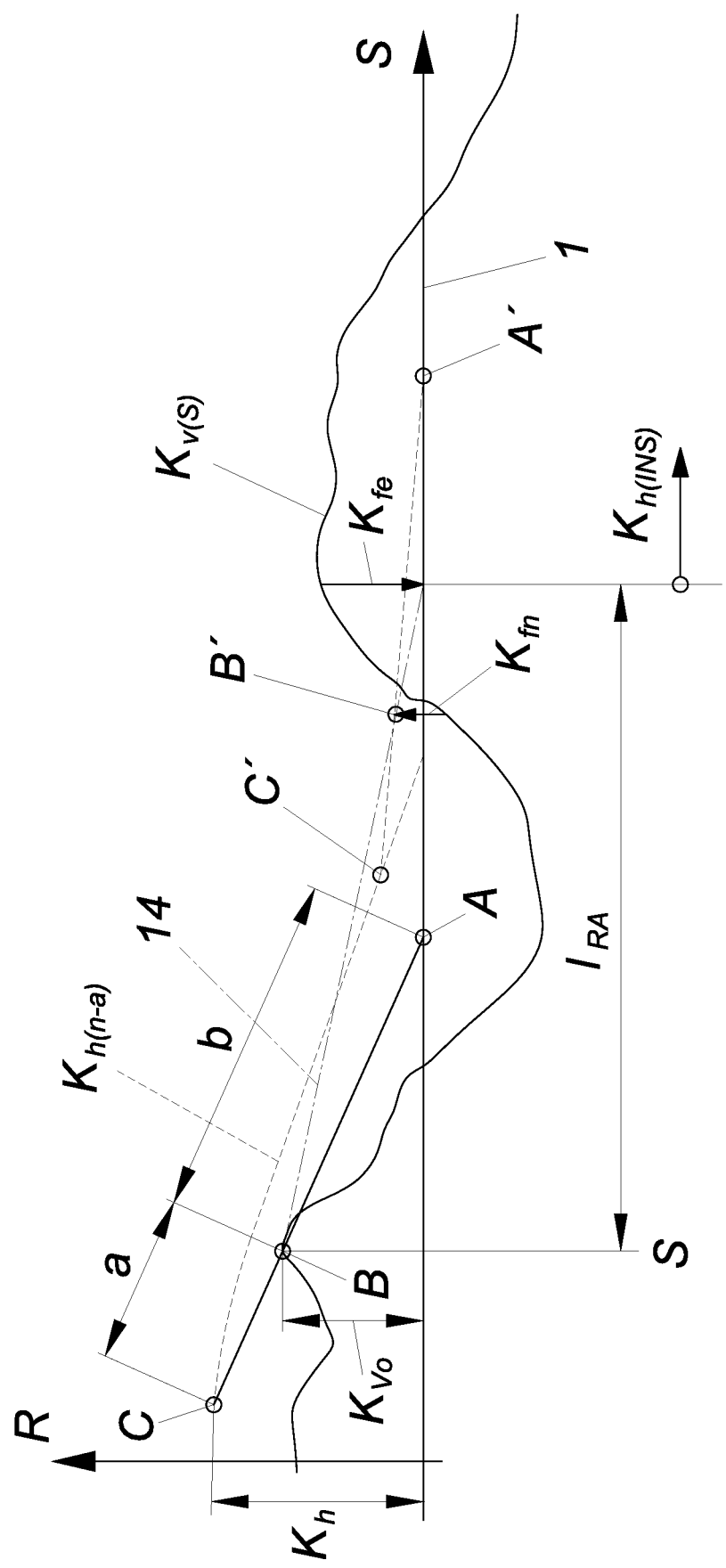
Figure 7:
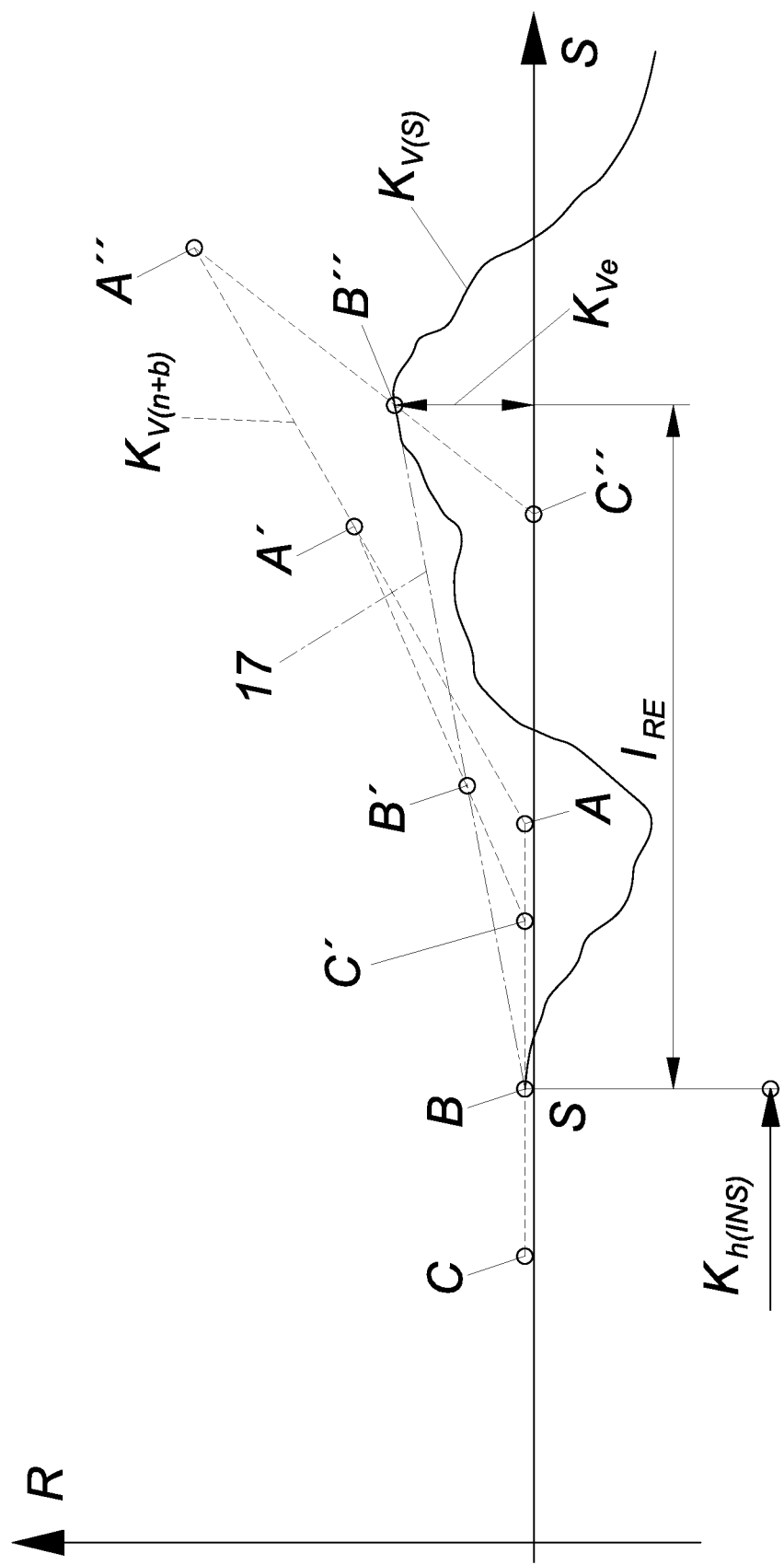

In the drawing, the subject matter of the invention is shown schematically by way of example, wherein:

FIG. 1 shows a schematic side view of a track-tamping machine,

FIG. 2 shows diagrams illustrating the situation with a known three-point remeasurement system and the system with INS unit according to the invention, FIG. 3 shows an illustration of the three-point method in the ideal case of a non-remaining track position error, FIG. 4 shows an illustration of the three-point method in case of a remaining track position error with feedback into the system, FIG. 5 shows a typical course of track position errors before and after correction by a track-tamping machine, FIG. 6 shows a schematic diagram describing the automatically controlled start ramp, FIG. 7 shows a schematic diagram describing the automatically controlled end ramp.

DESCRIPTION OF THE PREFERRED EMBODIMENTS

FIG. 1 shows a track-tamping machine for carrying out a method according to the invention. A trailer 7 is coupled to the track-tamping machine 6. The track-tamping machine 6 is equipped with a tamping unit 5. A lifting and straightening unit 8 is used to lift and straighten a track 11, which is to be corrected with regard to its position in a ballast bed, into the desired track position. A three-point work measurement system with three measuring carriages A, B, C and a cord 9, e.g. a steel cord, stretched between them, is provided under the track-tamping machine 6. On measurement carriage B, a sensor M measures the deflection of cord 9 in the vertical and lateral directions. The cord 9 has the length l and is divided into the cord sections a and b, between which the measurement carriage B is arranged.

For acceptance measurement, an acceptance cord 10 can be clamped between measurement carriage E and C on trailer 7. On measurement carriage D, the deflection in height and direction is again measured by sensor M. The length of the acceptance test cord is l' and it has the cord sections a' and b'. $f_l$ shows the residual error at the position of measurement carriage D when measured with the acceptance cord 10 stretched between measurement carriages E and C. In this case, since the absolute residual error cannot be measured directly, the residual error of track $K_h$ after tamping work must be determined by extrapolation from the measurements.

In the preferred embodiment according to the invention with inertial measurement system INS, the measurement carriages E and D are omitted. The inertial measurement system INS records the position of the track after the tamping machine has carried out its correction work. Instead of the measurement carriage C (with one axle) a 4-wheeled INS measurement carriage INS is set up. $K_h$ generally stands for the residual error determined. $K_{h(INS)}$ stands for the residual error determined with the inertial measurement system INS.

FIG. 2 shows in the upper diagram schematically the measured residual error $f_l$ as a function of the arc length s for embodiments of acceptance measurement systems with three-point cord, i.e. the measurement carriages C, D, E. The cord 10 is stretched between the measurement carriages E and C. During the work of the track-tamping machine (6) moving along the track, the last residual error measured in each case is thus measured on measurement carriage D. This means that there is a distance of length b' between the rear end of the cord on measurement carriage C and the residual error measured on measurement carriage D. This is usually between 5-8 m, depending on the embodiment of the measurement systems. This means that there is a distance of length b' between the residual error recorded on measurement carriage D, which is shown on the acceptance recorder, and the current residual error on measurement carriage C, which has not yet been recorded but is already faulty. If the operator wishes to correct the real residual error on test carriage C, he has to extrapolate its presumed size from the recorded error shape. This is difficult and the accuracy of the correction depends on the experience and intuition of the operator.

In the middle diagram of FIG. 2 this is indicated by the dashed line between measurement carriage D and C. The operator extrapolates this dashed line from the past curve progression and corrects the position of the rear end of the cord on measurement carriage C with the assumed correction value $K_h(c)$.

The lower diagram in FIG. 2 shows the conditions for the embodiment according to the invention with an inertial measurement system INS. A computer (R) calculates a residual error ($K_h$) from the difference between a predetermined desired track position (1) and an actual position recorded with the measurement system and continuously corrects the position of the rear cord end on measurement carriage C of the three-point work measurement system in such a way that the rear cord end on measurement carriage C is guided on desired track position 1. If the inertial measurement system INS is set up on the rear measurement carriage C of the three-point work measurement system of the track-tamping machine 6 with the measurement carriages A, B and C, the residual error can be determined directly by comparing the inertial measurement system measurements with the desired track position 1. The position of the rear end of the cord on measurement carriage C can thus be guided directly to the desired track position 1 by the correction value $K_{h(n)}$. The position of the rear end of the cord on the measurement carriage C at the desired track position 1 is preferably guided virtually in the computer R, but could also be guided directly mechanically on the measurement carriage C using a suitable actuator.

FIG. 3 schematically shows the ideal mode of operation of a three-point measurement system. The drawing shows the desired track position 1 and the faulty actual track position 2. By means of a pre-measurement, the deviations $K_v$ between the desired position and the actual position were determined and transferred to the computer R of the track-tamping machine 6. This enables the computer R to virtually guide one cord end on the desired track position on the measurement carriage C by means of compensation calculation. In reality, however, the cord point is located on the faulty actual track point C'. The other end of the cord on measurement carriage A is located on the already corrected, here ideally represented, faultless track 1. From the known desired track geometry the computer R calculates the desired track arrow height $f_s$ (for the transverse direction of the track) or the desired longitudinal track height (for the lifting of the track). $F_a$ is the measured arrow or longitudinal height. The lifting and straightening unit 8 of the machine now corrects the track so that the measured actual arrow height $f_a$ or actual longitudinal height corresponds to the calculated target value $f_s$ and is brought to desired track position 1. The track is thus corrected by the value $K_f$. Theoretically, the system works without errors.

FIG. 4 schematically shows the real function of a three-point work measurement system. However, in contrast to the ideal system (FIG. 3), the rear end of the cord on measurement carriage A is not at the desired track position 1, but trails around the residual error $K_h$ (point A"). Because of this faulty position of the cord on the measurement carriages A", B", C, the track position is incorrectly corrected. Thus a residual error F remains at the lifting and straightening point or at the measurement carriage B, B" because the residual error $K_h$ at the rear determines an excessive actual arrow height or actual longitudinal height. Exactly these errors are avoided with the method according to the invention.

FIG. 5 shows the schematic course of a track fault Lh before tamping 12 (solid line) and after tamping 13 (dashed line). Typically, the error wavelength is in the range of 10-15 m. The amplitudes of the fault are between 2 and 5 mm, depending on the track speed. As can be seen from the diagram, working with a prior-art permanent way machine only improves the track faults by approx. 30-50% with a similar defect pattern.

FIG. 6 schematically shows the calculation and the course of an automatic guidance of the start ramp 14. The ramp is formed by drawing a straight line with the ramp length $I_{RA}$ to the zero line from the starting point S at track fault $K_{v0}$. To form a starting ramp $I_{RA}$, the position of the rear end of the cord at the measurement carriage C is automatically guided from a zero correction at the start of work S to the desired track position 1 in such a way that the necessary track corrections $K_{v(s)}$ are continuously built up to the end of the ramp after a certain distance has been travelled. To ensure that the straightening and lifting values begin to rise slowly and that no abrupt correction is initiated, the rear end of the cord (cord sections a, b with cord length l=a+b) is guided (virtually) on measurement carriage C in such a way that the straightening and lifting values determined on measurement carriage B slowly rise up to the set ramp. At the starting point, the setpoint at correction point B is specified as zero, i.e. zero correction. In order for the setpoint at B to be zero, the rear end of the cord must be calculated by the computer R to be at the value $K_h$. The rear cord end C is guided on the curve $K_h(n-a)$ as work progresses. n is the respective position of correction point B. If, for example, the cord is in the drawn position on the measurement carriage A', B', C', then the correction value $K_h(n-a)$ of the rear cord end C' is calculated in such a way that the position of the lifting-straightening system B' is guided exactly on the ramp straight line. The track is corrected by the value $K_{fn}$ in such a way that it comes to lie on the ramp line. At the end of the ramp, for example, the correction $K_{fe}$ is performed. When continuing work, the rear cord end C and the front cord end A are guided on the desired track line (here the zero line) as provided for the three-point method. After the end of the ramp, the rear cord end is continued in a residual-error corrected manner ($K_{h(INS)}$) with the aid of the inertial measurement system INS.

The rear end of the cord C is to be guided mathematically on the following curve:

$$K_h(n-a) = K_{v0} \cdot n/l_{RA} \cdot l/b \text{ für } S \leq n \leq S + l_{RA}$$

$$K_h(n-a) = 0 \text{ für } n > S + l_{RA}$$

FIG. 7 schematically shows the calculation and the course of the automatic guidance of the end ramp 17. To form an end ramp $I_{RE}$, the position of the cord end on the measurement carriage A is automatically guided from the desired track position 1 to a zero correction at the end of work $K_{v(n+b)}$ in such a way that the necessary track corrections $K_{v(s)}$ are continuously reduced over a certain distance. The ramp is formed by drawing a straight line with the ramp length $L_{RE}$ from the starting point S from the zero line to the track fault $K_{vE}$. In order to slowly reduce the straightening and lifting values, the front end A of the cord (cord sections a, b with cord length l=a+b) is guided in such a way that the straightening and lifting values resulting at B slowly decrease according to the ramp. At the starting point S of the end ramp 17, the front and rear cord ends are on the zero line. If the cord is e.g. in the position at the measurement carriages A', B', C', then the front end of the cord must lie on the line $K_v(n+b)$ in such a way that B' comes to rest on the ramp line 17. At the end of the ramp (also working end), B" is directly on the track fault $K_{vE}$, the rear cord end C" is on the zero line and the front cord end A" is on line $K_v(I_{RE}+b)$ and there is no lifting or straightening process. The track was continuously transferred from the last exactly corrected track position S via ramp line 17 to the track fault $K_{vE}$ present at the end of the ramp.

The front end of the cord A is to be guided mathematically on the following curve:

$$K_v(n+b) = K_{VE} \cdot \frac{n}{l_{Re}} \cdot \frac{l}{a} \text{ für } S \leq n \leq S + S + l_{RE}$$

$$K_v(n+b) = 0 \text{ für } n > S + l_{RE}$$

The residual error correction of the rear cord end C by the inertial measurement system INS ends at the beginning of ramp S, since otherwise the desired adaptation curve (acts like a residual error for the inertial measurement system INS) would be corrected by the inertial measurement system INS.

The shown courses for the ramps are shown here schematically for the correction of the lateral position of the track. The same procedure is used for track elevation.

The invention claimed is:

1. A method comprising:
performing correction work providing track position improvement using a track-movable track-tamping machine with a three-point work measurement system having three measurement carriages and a cord stretched therebetween, a tamping unit, and a lifting and straightening unit for tracks; and
recording an actual position of the track after the correction work of the track-tamping machine using the measurement system;
calculating using a computer a difference between a predetermined desired track position and the actual position recorded by the measurement system, as a residual error; and
continuously adjusting a detected position of a rear cord end on a rear measurement carriage of the measurement carriages of the track-tamping machine of the three-point work measurement system so that an adjusted detected position the rear cord end on the rear measurement carriage is guided on the desired track position; and
calculating with the computer a correction of a position the track to a desired track position using the adjusted detected position of the rear cord end in the three-point measurement system; and
correcting the position of the track with the track-movable track-tamping machine so as to place said track into a position defined by said calculated correction.

2. A method according to claim 1, wherein the position of the rear cord end on the measurement carriage for forming an initial ramp is automatically guided towards the desired track position from a zero correction at a start of work so that the track corrections are continuously built up.

3. A method according to claim 1, wherein the position of the cord end on the measurement carriage for forming an end ramp is automatically guided from the desired track position to a zero correction at the end of work so that the track corrections are continuously reduced.

4. A method according to claim 1, wherein an inertial measurement system is operatively associated with the rear measurement carriage, and the inertial measurement system records the position of the track after the correction work of the tamping machine.

5. A method according to claim 1, wherein the determination of the residual error of the track after the correction work is carried out by extrapolation from measurements of a subsequent acceptance three-point measurement system with three measurement carriages, one of which may be in the three-point work measurement system and a cord stretched therebetween.

6. A method according to claim 2, wherein the position of the cord end on the measurement carriage for forming an end ramp is automatically guided from the desired track position to a zero correction at the end of work so that the track corrections are continuously reduced.

7. A method according to claim 2, wherein an inertial measurement system is operatively associated with the rear measurement carriage, and the inertial measurement system records the position of the track after the correction work of the tamping machine.

8. A method according to claim 3, wherein an inertial measurement system is operatively associated with the rear measurement carriage and the inertial measurement system records the position of the track after the correction work of the tamping machine.

9. A method according to claim 6, wherein an inertial measurement system is operatively associated with the rear measurement carriage and the inertial measurement system records the position of the track after the correction work of the tamping machine.

10. A method according to claim 2, wherein the determination of the residual error of the track after the correction work is carried out by extrapolation from measurements of a subsequent acceptance three-point measurement system with three measurement carriages, one of which may be in the three-point work measurement system and a cord stretched therebetween.

11. A method according to claim 3, wherein the determination of the residual error of the track after the correction work is carried out by extrapolation from measurements of a subsequent acceptance three-point measurement system with three measurement carriages, one of which may be in the three-point work measurement system and a cord stretched therebetween.

12. A method according to claim 6, wherein the determination of the residual error of the track after the correction work is carried out by extrapolation from measurements of a subsequent acceptance three-point measurement system with three measurement carriages, one of which may be in the three-point work measurement system and a cord stretched therebetween.

13. A method according to claim 7, wherein the determination of the residual error of the track after the correction work is carried out by extrapolation from measurements of a subsequent acceptance three-point measurement system with three measurement carriages, one of which may be in the three-point work measurement system and a cord stretched therebetween.

14. A method according to claim 8, wherein the determination of the residual error of the track after the correction work is carried out by extrapolation from measurements of a subsequent acceptance three-point measurement system with three measurement carriages, one of which may be in the three-point work measurement system and a cord stretched therebetween.

15. A method according to claim 9, wherein the determination of the residual error of the track after the correction work is carried out by extrapolation from measurements of a subsequent acceptance three-point measurement system with three measurement carriages, one of which may be in the three-point work measurement system and a cord stretched therebetween.

16. A method for improving positioning of a track of a railroad bed, said method comprising:
providing a track-tamping machine being movably supported on said track, and having a three-point work measurement system having three measurement carriages, a tamping unit, and a lifting and straightening unit for tracks;
said three point measurement system having a rear point A on a rearmost of the measurement carriages and a front point C on a forwardmost of the measurement carriages, said tamping unit and said lifting and straightening unit being located therebetween;
performing correction work on the track using the track-tamping machine so as to move a portion of the track toward a predetermined desired position therefor;
moving the track-tamping machine forward so that the lifting and straightening unit is operable on another portion of the track;
recording an actual position of the track after the correction work of the track-tamping machine in an area of the rear point A;
calculating using a computer a residual error as a difference between a predetermined desired track position and the actual position of the track; and
measuring a position of the rear point A on the rearmost of the measurement carriages in said three-point measurement system;
deriving in the computer an adjusted position of the rear point A from the measured position of the rear point A on the rearmost of the measurement carriages in said three point measurement system and the residual error such that said adjusted position of the rear point A corresponds to the desired track position;
measuring a position of the front point C on the forwardmost of the measurement carriages of said three-point measurement system;
determining a correction for movement of said another portion to a desired position therefor, said correction being derived from the measured position of front point C and the adjusted position of rear point A in the computer; and
moving said another portion of the track to the desired position thereof based on the correction and using the lifting and straightening unit.

17. The method according to claim 16, wherein the actual position of the track is determined using an inertial measurement system.

18. The method according to claim 16, wherein the actual position of the track is determined using a second three-point measurement system.

19. The method according to claim 16, wherein the adjusted position of the rear point A is derived continuously so that the adjusted position of the rear point A is guided on a curve of the desired track position as the track-tamping machine is moved on the track.

20. The method according to claim 16, wherein, in an initial ramp of the method improving positioning of the track, the position of the rear point A on the rear measurement carriage is automatically guided towards the desired track position from a zero correction at a start of work so that the track corrections are continuously built up.

21. A method according to claim 16, wherein, in an end ramp of the method improving positioning of the track, the position of the rear point A on the rear measurement carriage is automatically guided from the desired track position to a zero correction at the end of work so that the track corrections are continuously reduced.

* * * * *